(12) United States Patent
Channabasavaiah et al.

(10) Patent No.: US 8,355,940 B2
(45) Date of Patent: Jan. 15, 2013

(54) CAPABILITY AND MATURITY-BASED SOA GOVERNANCE

(75) Inventors: Klshore Channabasavaiah, Palatine, IL (US); Sri Ramanathan, Lutz, FL (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 12/410,554

(22) Filed: Mar. 25, 2009

(65) Prior Publication Data

US 2010/0250297 A1 Sep. 30, 2010

(51) Int. Cl.
*G06Q 10/00* (2006.01)
(52) U.S. Cl. ........................ 705/7.11; 705/7.37; 705/7.39
(58) Field of Classification Search .................. 705/7.11, 705/7.37, 7.39
See application file for complete search history.

(56) References Cited

U.S. PATENT DOCUMENTS

| | | | |
|---|---|---|---|
| 2004/0193703 A1* | 9/2004 | Loewy et al. .................. | 709/220 |
| 2006/0235733 A1* | 10/2006 | Marks .............................. | 705/7 |
| 2007/0022404 A1 | 1/2007 | Zhang et al. | |
| 2008/0127047 A1 | 5/2008 | Zhang et al. | |
| 2008/0167929 A1 | 7/2008 | Cao et al. | |
| 2008/0249825 A1* | 10/2008 | Kunjur et al. ..................... | 705/8 |
| 2008/0250071 A1 | 10/2008 | Norring et al. | |
| 2008/0285481 A1 | 11/2008 | Hao et al. | |
| 2008/0294408 A1 | 11/2008 | Padmanabhan | |
| 2009/0064087 A1* | 3/2009 | Isom ............................. | 717/101 |
| 2010/0138247 A1* | 6/2010 | Botham et al. ..................... | 705/7 |

FOREIGN PATENT DOCUMENTS

WO 2005048066 5/2005

OTHER PUBLICATIONS

Niemann et al., "Towards a Generic Governance Model for Service Oriented Architectures," Proceedings of the Fourteenth Americas Conference on Information Systems, Toronto, ON, Canada, AIS, Aug. 2008, 10 pgs.*
T. G. J. Schepers, M. E. Iacob, and P. A. T. Van Eck. A lifecycle approach to SOA governance. In SAC '08: Proceedings of the 2008 ACM symposium on Applied computing, pp. 1055-1061, New York, NY, USA, Mar. 2008. ACM.*
Srikanth Inaganti et al., SOA Maturity Model. BP Trends, Apr. 2007, 23 pgs.*
Varadan et al., Increasing business flexibility and SOA adoption through effective SOA governance. IBM Systems Journal, vol. 47, No. 3, 2008, pp. 473-488.*

* cited by examiner

*Primary Examiner* — Lynda Jasmin
*Assistant Examiner* — Timothy Padot
(74) *Attorney, Agent, or Firm* — Patrick J. Daugherty; Driggs, Hogg, Daugherty & Del Zoppo Co., LPA

(57) ABSTRACT

Methods, including service methods, articles of manufacture, systems, articles and programmable devices are provided for a service-oriented architecture governance model. Each of a plurality of governance dimension attributes of a service-oriented architecture are calibrated and mapped to each of a plurality of governance evolution element attributes. A maturity and capability assessment is performed for the service-oriented architecture as a function of the mapping, and a maturity-based and capability-based governance model is generated for the service-oriented architecture as a function of the maturity and capability assessment. In one aspect a programmable device is configured to perform at least one of the calibrating, the mapping, the performing the maturity and capability assessment and the generating the maturity-based and capability-based governance model.

16 Claims, 7 Drawing Sheets

160 →

161 →

| Governance & Management Element : *People Skills and Organization Capabilities* | Att-2 : *Business Services Portfolio management capabilities and techniques* 162 | | |
|---|---|---|---|
| 163 → Attribute Description 164 | SOA Governance evolution state 169 | Current | Desired 170 |
| This attribute focuses on | 5. Planning, execution & monitoring of cross-business unit initiatives & portfolio management which is supported by automated tools | | |
| | 4. Organization has established sound management techniques and fairly advanced through use of tools, and mature and integrated cross-business unit objectives. | | 173 → X |
| | 3. Business imperatives demand cross-business unit integration and portfolio management, and the organization has both skills and building blocks to mature portfolio management. | | |
| 165 → Select aspects this SOA Governance & Management attribute align best? | 2. The organizational culture relies on desktop software based portfolio management and individual stakeholders rely on taking personal efforts to integrate portfolios across business units. | X → 172 | |
| Business & IT Alignment ☐ Ownership & Decision Rights ☐ Asset Lifecycle Mgmt ☐ Operational Mgmt ☐ 166 | 1. The general organizational culture relies on ad-hoc and individual heroic efforts to manage program portfolio, and not much integration across the business units. 171 | | |
| Applicable lifecycle stage(s) - default values 167 | | SOA Governance focus 174 | |
| Business Strategy ☐ IT Strategy ☐ Business Planning & Transformation ☐ Program Planning ☐ Project Planning & Execution ☐ 168 Deploy & Manage ☐ | | Services Lifecycle ☐ Enterprise Architecture ☐ Services Portfolio ☐ Organization Change ☐ 175 | |

| Entities and Attributes | BIA-1 | BIA-2 | BIA-3 | BIA-4 | BIA-5 |
|---|---|---|---|---|---|
| People Skills and Organization Capabilities | | | | | |
| Organization's tolerance for change in moving to a Service Oriented enterprise | 4 | | 2 | | |
| Business Services Portfolio management capabilities and techniques | | 4 — 179 | | 1 | |
| Business Services communication planning, execution and management | | | | | 5 |
| Business Services Stakeholder Management planning and execution | | | | | |
| Business Services and SOA skills development | | 7 | | | |
| Business domain and IT Staff Planning to infuse Business Services culture | | | 4 | | |

CAPABILITY AND MATURITY-BASED SOA GOVERNANCE

FIELD OF THE INVENTION

The present invention generally describes the governance and management of the evolution of shared services in service-oriented architecture.

BACKGROUND OF THE INVENTION

It is known for organizations to use service-oriented architecture (SOA) methods, systems and governance models to develop and deploy shareable and reusable services which need to evolve over time. SOA governance generally encompasses an entire organization involved in a transformation and requires participation by multiple stakeholders in definition and realization. However, existing information technology (IT) and SOA governance methods have inadequacies and do not drive effective change and service adoption across an enterprise, generally ignoring business domain aspects of SOA governance and management.

SUMMARY OF THE INVENTION

Methods provide a service-oriented architecture governance model. Each of a plurality of governance dimension attributes of a service-oriented architecture are calibrated and mapped to each of a plurality of governance evolution element attributes. A maturity and capability assessment is performed for the service-oriented architecture as a function of the mapping, and a maturity-based and capability-based governance model is generated for the service-oriented architecture as a function of the maturity and capability assessment. In one aspect methods comprise providing a programmable device configured to perform at least one of the calibrating, the mapping, the performing the maturity and capability assessment and the generating the maturity-based and capability-based governance model.

Service methods are also provided comprising deploying applications for providing a service-oriented architecture governance model according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for providing a service-oriented architecture governance model. Moreover, systems, articles and programmable devices are also provided, configured for performing one or more method and/or process elements of the current invention for providing a service-oriented architecture governance model, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which:

FIG. 4 is a diagram of a template for SOA governance & management capability assessment according to the present invention.

FIG. 5 is a diagram of a spreadsheet representative of an application of the template of FIG. 4 according to the present invention.

Figure 1:
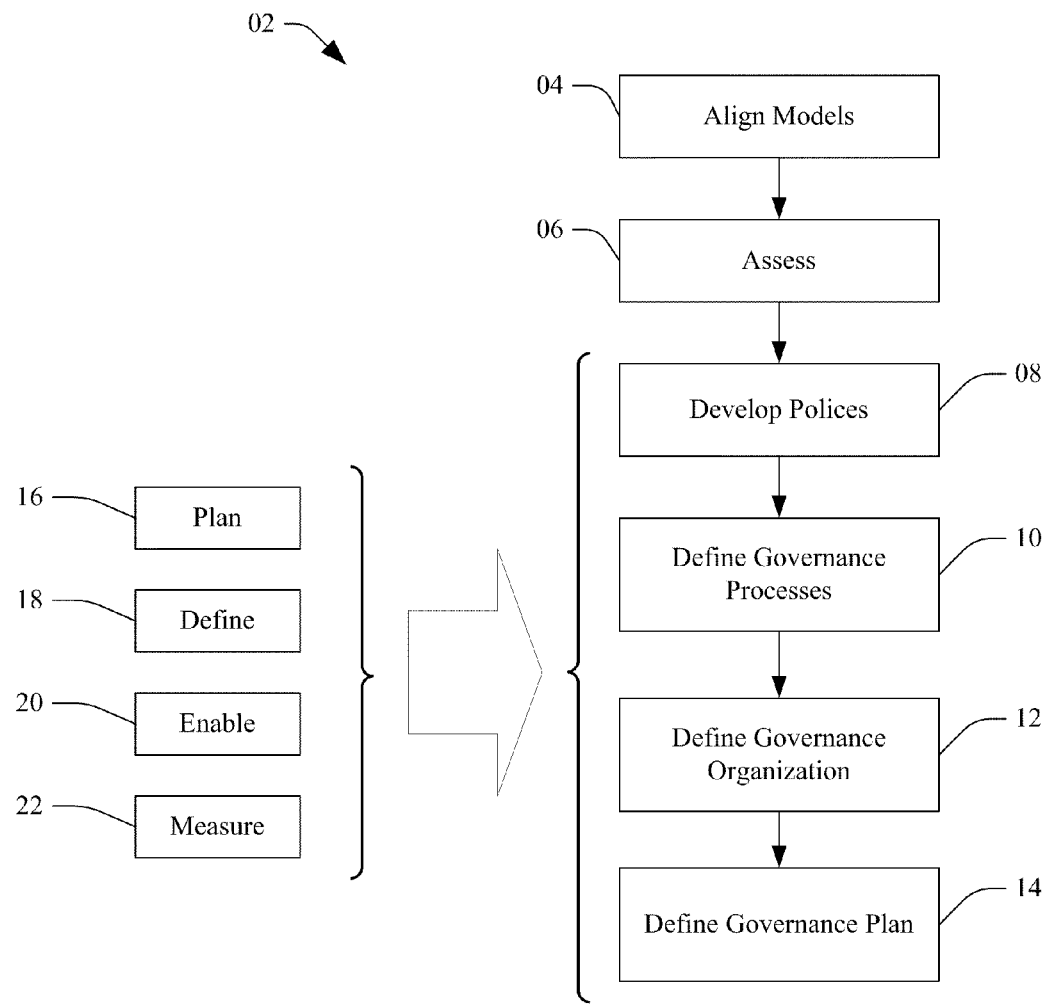
FIG. 1 is a block diagram illustration of a prior art SOA governance model.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description; and
II. Computerized Implementation.

I. General Description

Examples of SOA aspects and governance processes according to the present invention may be found in the following commonly-owned and co-pending U.S. patent applications or issued U.S. patents, the disclosures of which are expressly incorporated herein by reference: "Identifying a Service Oriented Architecture Shared Services Project", filed on Nov. 24, 2008, and assigned application Ser. No. 12/277,280; "Evaluating a Service Oriented Architecture Shared Services Project", filed on Feb. 19, 2009, and assigned application Ser. No. 12/388,533; "Selecting a Service Oriented Architecture Shared Service", filed on Feb. 24, 2009, and assigned application serial no. 12/391,426; "Service Oriented Architecture Shared Services Elaboration", filed on Feb. 24, 2009, and assigned application Ser. No. 12/391,728; "Service Oriented Architecture Shared Services Construction", filed on Feb. 25, 2009, and assigned application Ser. No. 12/392,189; "Transitioning to Management of a Service Oriented Architecture Shared Service", filed on Feb. 25, 2009, and assigned application Ser. No. 12/391,728; "Management of a Service Oriented Architecture Shared Service", filed on Feb. 26, 2009, and assigned application serial no. 12/393,110; "Service Oriented Architecture Shared Service Escalation", filed on Feb. 24, 2009, and was assigned application Ser. No. 12/391,362; "SOA Policy Versioning", filed on Mar. 25, 2009, and assigned application Ser. No. 12/410,488; "FRAMEWORK FOR VARIATION ORIENTED ANALYSIS FOR SERVICE-ORIENTED ARCHITECTURE", filed on Mar. 25, 2009, and assigned application Ser. No. 12/410,491; "TECHNICAL FEASIBILITY EXPLORATION FOR SERVICE-ORIENTED ARCHITECTURE ENVIRONMENTS", filed on Mar. 25, 2009, and assigned application Ser. No. 12/410,493; "SOA Lifecycle Governance and Management", filed on Mar. 25, 2009, and assigned application Ser. No. 12/410,497; "ENABLING SOA GOVERNANCE USING A SERVICE LIFECYCLE APPROACH", filed on Mar. 25, 2009, and assigned application Ser. No. 12/410,503; "CALIBRATION FRAMEWORK FOR EFFORT ESTIMATION", filed on Mar. 25, 2009, and assigned application serial no. 12/410,509; "SERVICE PORTFOLIO APPROACH FOR SOA GOVERNANCE", filed on Mar. 25, 2009, and assigned application Ser. No. 12/410,526; "SERVICE EVOLUTION APPROACH IN SOA", filed on Mar. 25, 2009, and assigned application Ser. No. 12/410,541; "PRIORITIZATION ENABLEMENT FOR SOA GOVERNANCE", filed on Mar. 25, 2009, and assigned application Ser. No. 12/410,572; and "SOA POLICY ENGINE FRAMEWORK", filed on Mar. 25, 2009, and assigned application Ser. No. 12/410,592.

SOA governance may be understood to encompass an entire organization involved in a transformation and should require participation by multiple stakeholders in definition and realization. A well-defined governance framework and underlying model helps to drive effective change across an enterprise, and may be a key to success irrespective of an entry point chosen by an enterprise for an SOA transformation. Additionally, an effective SOA governance model may be realized by establishing a governance body comprising domain owners and stakeholders with delegated responsibility for decision making.

Prior art IT and SOA governance methods generally fail to drive effective change and service adoption across an enterprise through ignoring the business domain aspects of SOA governance and management. For example, FIG. 1 illustrates a prior art SOA governance process 02 according to CBDI's Service Architecture & Engineering™ (CBDI-SAE™) (CBDI'S SERVICE ARCHITECTURE & ENGINEERING and CBDI-SAE are trademarks of Everware-CBDI in the United States and/or other countries.) The CBDI-SAE™ process 02 tends to be overly generic in nature, and uses an "Align 04-Assess 06-Develop Policies 08-Define Governance Processes 10-Define Governance Organization 12-Define Governance Plan 14" model, which while incorporating Plan 16, Define 18, Enable 20 and Measure 22 aspects in the Develop Policies 08, Define Governance Processes 10, Define Governance Organization 12 and Define Governance Plan 14 steps, nevertheless ignores business domain aspects of SOA governance and management. Other prior art examples include HP's SOA Governance Interoperability Framework (GIF)™ and CobiT™ (HP's SOA GOVERNANCE INTEROPERABILITY FRAMEWORK (GIF) is a trademark of Hewlett-Packard Company in the United States and/or other countries; COBIT is a trademark of ISACA in the United States and/or other countries).

Inadequacies of the prior art also include: lacking consideration of governance maturity and adoption capability of an enterprise in context, focusing instead on maturity of governance processes; lacking an evolution model that helps define SOA governance building blocks that may align with an SOA adoption roadmap within an organization; lacking a simple analytical approach to assess current needs and define gaps for future SOA governance capabilities based on a holistic model for SOA; requiring extensive knowledge of overall subject domains and an organization's environment to understand, assess and recommend governance needs; continuing to be primarily focused on the IT governance domains and not business aspects elevated by SOA; and defining a governance model on a framework that addresses governance and management capabilities at post-IT strategy stages of a lifecycle.

Figure 2:
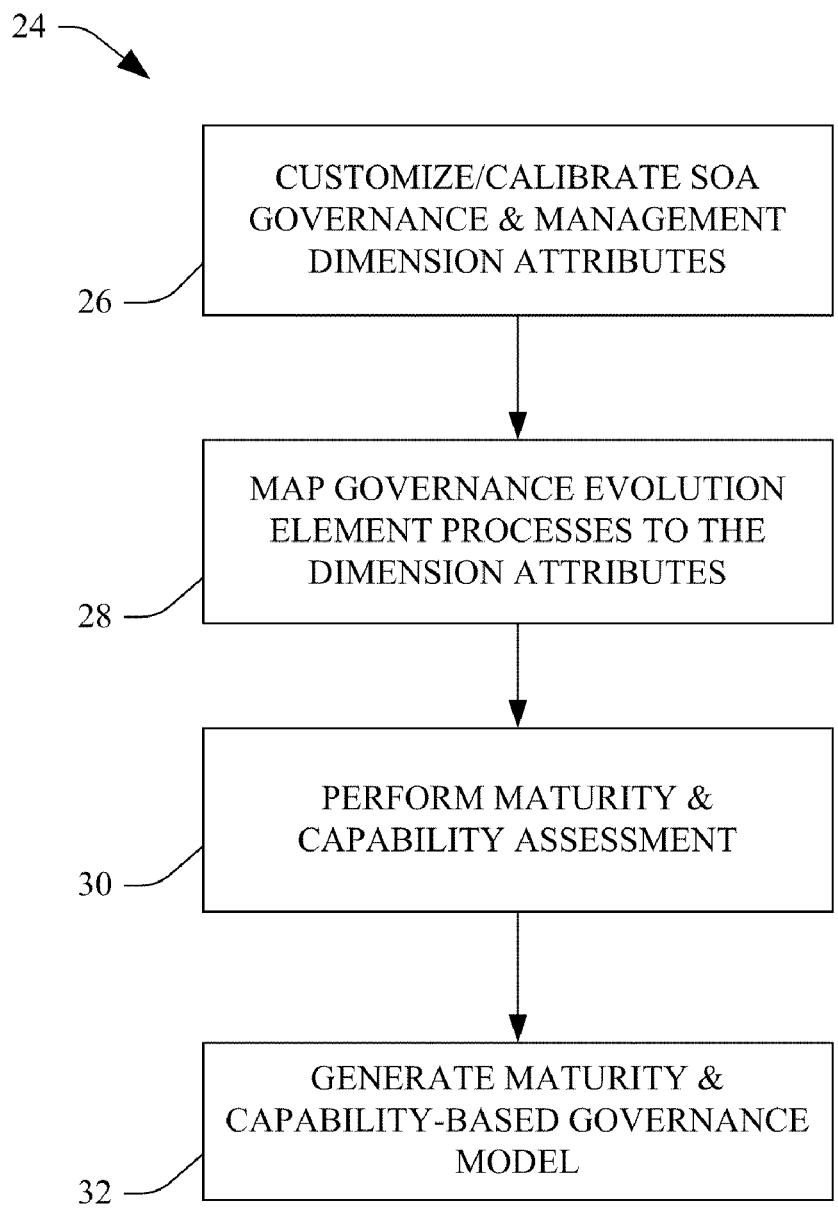
FIG. 2 is a flow chart illustrating a process for SOA governance enablement according to the present invention.

FIG. 2 illustrates a maturity-based process 24 for assessing attributes for SOA governance enablement according to the present invention. The process 24 comprises calibrating (in some examples including customizing) each of a plurality of SOA governance dimension processes or attributes relative to a service-oriented architecture, governance and management structure and entities at 26. At 28 each of a plurality of governance evolution element attributes are mapped to the plurality of governance dimension processes as a function of the calibrating at 26, in some examples comprising customizing and calibrating the mappings and/or providing scoring criteria. At 30 a maturity and capability assessment is performed for the service-oriented architecture as a function of the mapping, and at 32 a maturity and capability-based governance model is generated for the service-oriented architecture as a function of the maturity and capability assessment.

Figure 3:
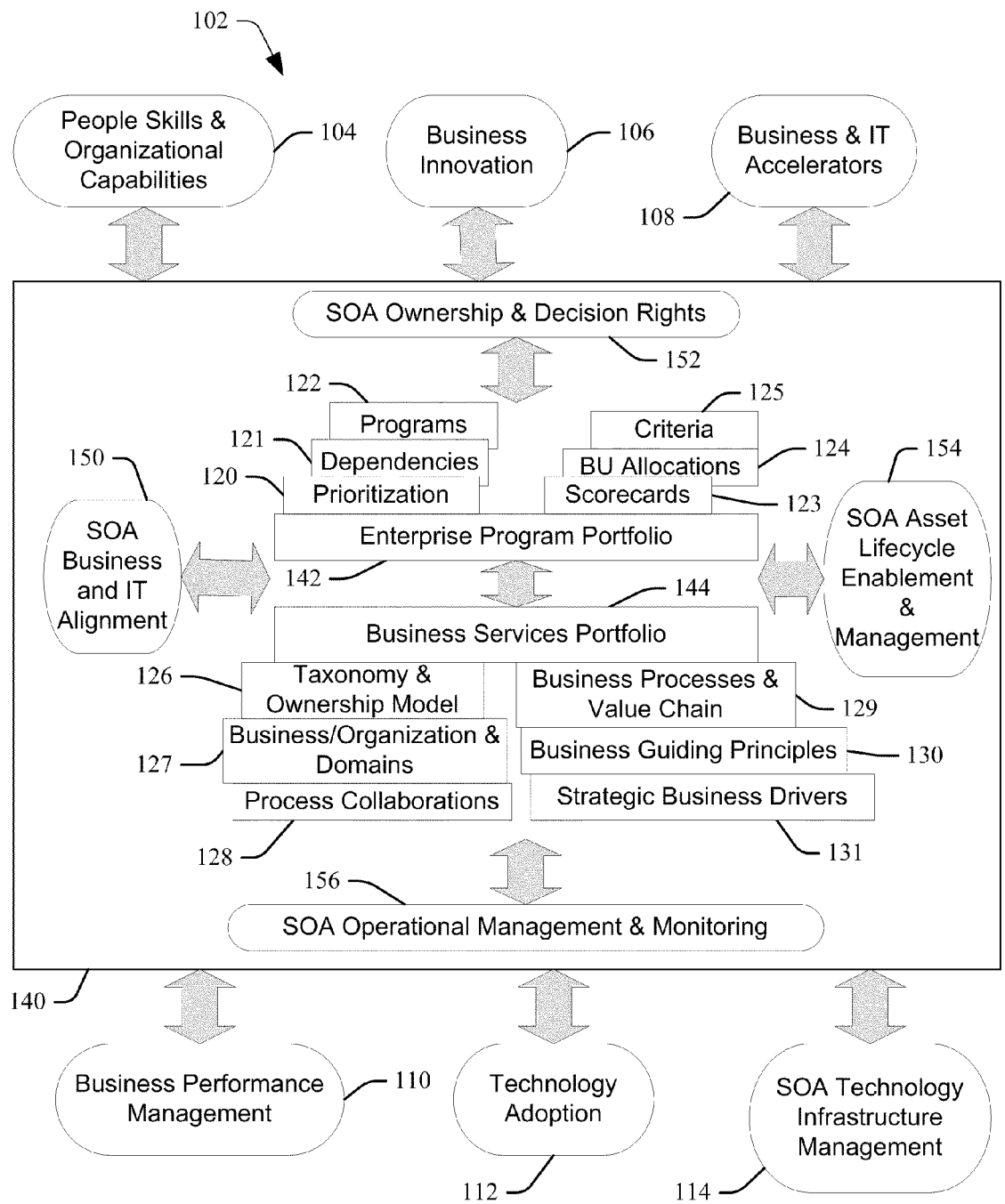
FIG. 3 is a block diagram illustration of a mapping framework according to the present invention.

FIG. 3 illustrates a mapping framework 102 according to the present invention for use with the governance enablement process 24 of FIG. 2. The mapping framework 102 incorporates an end-to-end SOA Governance Framework 140 identifying four major dimensions: an SOA Business and IT Alignment dimension 150, an SOA Ownership & Decision Rights dimension 152, an SOA Asset Lifecycle Enablement and Management dimension 154 and an SOA Operational Management and Monitoring dimension 156, each of which are centered around an Enterprise Business Portfolio 142 and a Business Services Portfolio 144, and each of which comprises a plurality of defined processes. (The SOA Governance Framework 140 is more fully discussed in the commonly-owned and co-pending U.S. patent application or issued U.S. patent entitled "SOA Lifecycle Governance and Management", filed on Mar. 25, 2009, and assigned application Ser. No. 12/410,497, the disclosure of which has been previously and expressly incorporated herein by reference.)

The mapping framework 102 also comprises six major governance evolution elements 104, 106, 108, 110, 112, 114 of an SOA enterprise, each of which comprises a defined set of attributes. Referring again to FIG. 2, the governance evolution elements 104, 106, 108, 110, 112, 114 attributes are measured and/or assessed at 26 in an objective way based on a corresponding organization's SOA needs in adopting SOA governance capabilities and customized and calibrated in, and then mapped at 28 to a each of a plurality of processes (e.g. capabilities, mechanisms and/or techniques, etc.) of each of the four major dimensions 150, 152, 154 and 156 of the SOA Governance Framework 140. In some embodiments, customizing and calibrating and/or mapping at 26 and/or at 28 comprises using a weighted-average approach, including in some examples to determine necessary processes, mechanisms and techniques.

Illustrative but not exhaustive examples of the mapped attributes of the People Skills and Organization Capabilities governance evolution element 104 include: an organization's tolerance for change in moving to a service-oriented enterprise; business services portfolio management capabilities and techniques; business services communication planning, execution and management; business services stakeholder management planning and execution; business services and SOA skills development; and business domain and IT staff planning to infuse a business services culture.

Illustrative but not exhaustive examples of the mapped attributes of the Business Innovation (Products and Services Strategy) governance evolution element 106 include: management of product and services (business) portfolio; a product and services portfolio driving a collaborative nature across business units; business governance processes alignment with changing products and services strategy; business taxonomy alignment with products and services; business process alignment and management in the context of changing products and services portfolio; and alignment of an IT strategic plan based on strategic business initiatives.

Illustrative but not exhaustive examples of the mapped attributes of the Business and IT Accelerators governance evolution element 108 include: identifying and planning service oriented opportunities as part of business case and business program development; business projects prioritization based on service oriented aspects; an organization's ability and need to foster collaborative business components; business Services criteria, scorecards, monitoring and measurement capabilities; processes and mechanisms determining a technology investment path; and soundness of a business strategy to drive architecture design and IT investment planning.

Illustrative but not exhaustive examples of the mapped attributes of the Business Performance Management governance evolution element 110 include: the proliferation of collaboration across an enterprise through business services; an ability to view business processes across collaborative business units; mechanisms and flexibility of current infrastructure to infuse business activity-level monitoring; the maturity of products and a services portfolio to define metrics for business performance monitoring and measurement; and the knowledge of business process models across or within business units.

Illustrative but not exhaustive examples of the mapped attributes of the Technology Adoption governance evolution element 112 include: an organization's ability to adopt a competitive and technical marketplace and incorporate same into IT investment planning; a level of external market and competitive forces on the business services portfolio which influences the planning and execution of technology investments; an availability of appropriate business and economic context to drive technology integration, migration or consolidation decisions; the existence of established, mature and comprehensive architectural approaches with ability to address future business plans; and a linkage between the magnitude of issues in a current technical environment, potential solutions and a value proposition (e.g. business case) of addressing challenges.

Illustrative but not exhaustive examples of the mapped attributes of the SOA Technology Infrastructure Management governance evolution element 106 include: the maturity and readiness of current/planned operations and technical infrastructure to support growth in products and services; the allocation of system staff to the maintenance of existing systems versus future development or architectural evolution; capabilities to monitor and report both business and IT-level metrics of business processes; the maturity of current application and information architectures aligning with a service-oriented view of business processes; the complexity and intensity of an ability to provision and manage the usage of a service-oriented enterprise; and a business services consumer-to-provider skew and infrastructure capabilities to support growing business needs (e.g. provisioning, monitoring, deploying, etc.).

Illustrative but not exhaustive examples of the mapped processes of the SOA Governance Framework 140 SOA Business and IT alignment aspect 150 include: Enterprise Program Portfolio 142 & Business Services Portfolio 144 alignment; business services discovery; program & services prioritization; business case & planning; business process collaborations; business services identification; business & IT change management; and business services policy strategy & definition processes, and other processes may be apparent to one skilled in the art.

Illustrative but not exhaustive examples of the mapped processes of the SOA Governance Framework 140 SOA Ownership & Decision Rights dimension 152 include: business services ownership, business services funding, domain classification & taxonomies, business services ownership change management, business services stakeholder management and business services policy ownership & stakeholder assignment processes, and other processes may be apparent to one skilled in the art.

Illustrative but not exhaustive examples of the mapped processes of the SOA Governance Framework 140 SOA Asset Lifecycle Enablement and Management dimension 154 include service discovery & publishing, asset discovery & publishing, asset lifecycle change management, business services asset reuse management, business services & SOA standards, business services asset reuse programs, asset repositories & registries and business services policy registry processes, and other processes may be apparent to one skilled in the art.

Illustrative but not exhaustive examples of the mapped processes of the SOA Governance Framework 140 SOA Service Operational Management and Monitoring 156 processes include business services utilization & metering, business services performance monitoring, operational service change management, services provisioning, business services metrics measurement, services testing and certification, business services version management and business services policy enforcement & monitoring compliance processes, and other processes may be apparent to one skilled in the art.

FIG. 4 illustrates a multi-dimensional Capability Assessment Template 160 model providing a comprehensive, unified and end-to-end capability assessment framework which outlines a prescriptive approach to perform SOA governance & management capability assessment based on service-oriented enterprise governance & management entities. More particularly, the Template 160 is used to measure and rate the mapped Governance Framework 140 dimension 150,152,154,156 entities or processes and associated governance evolution element 104,106,108,110,112,114 attributes, i.e. for use in performing the maturity and capability assessment at 30 of the process 24 of FIG. 2. Generally, one Template 160 is used for each attribute within the six governance evolution elements 104,106,108,110,112,114; the present example 160 in FIG. 4 is for an "Attribute 2: Business Services Portfolio management capabilities and techniques" attribute (indicated at 162) of the People, Skills and Organizational Capabilities governance evolution element 104 (indicated at 161).

An Attribute Description 163 header identifies content requested or retrieved (i.e. by a stakeholder, user or a programmable device) to populate the associated field 164. A best governance alignment choice 165 identifies categorization of the present attribute as within one of the four major SOA Governance Framework 140 dimensions (SOA Business and IT Alignment dimension 150, SOA Ownership & Decision Rights dimension 152, SOA Asset Lifecycle Enablement and Management dimension 154 or SOA Operational Management and Monitoring dimension 156), indicated by selection/population of one the answer bubble/fields 166.

Governance capability determined by the assessed attribute to the appropriate SOA Lifecycle stage(s) 167 is allocated and assigned pursuant to selection/population of one of the associated answer bubble/fields 168. Assigning the assessed attribute to one or more SOA Governance Focus components 174 helps determine the right mix of governance enablement approach, as provided by the associated answer bubble/fields 175. And lastly, determination of SOA Governance Evolution states 169 (as described by the description fields 171) for both current and desired states 170 is provided: in the present example the current state indicated at 172 as state number 2, with the desired state indicated at 173 to be state number 4.

In one aspect, the Template 160 thus integrates maturity assessment with the end-to-end SOA lifecycle view, and provides an ability to define an SOA Governance model based on all governance focus points that will address any organizational culture and style. Templates 160 according to the present invention are generally pre-defined, but also modifiable to accommodate attributes evolution and provide normative guidance, thus exhibiting self-learning and adaptable capabilities with respect to predefined values of attributes as a function of their evolution stages. The Template 160 thus provides a prescriptive process that arrives at individual assessments and aggregates results to arrive at mapping to the governance model.

Figure 6:
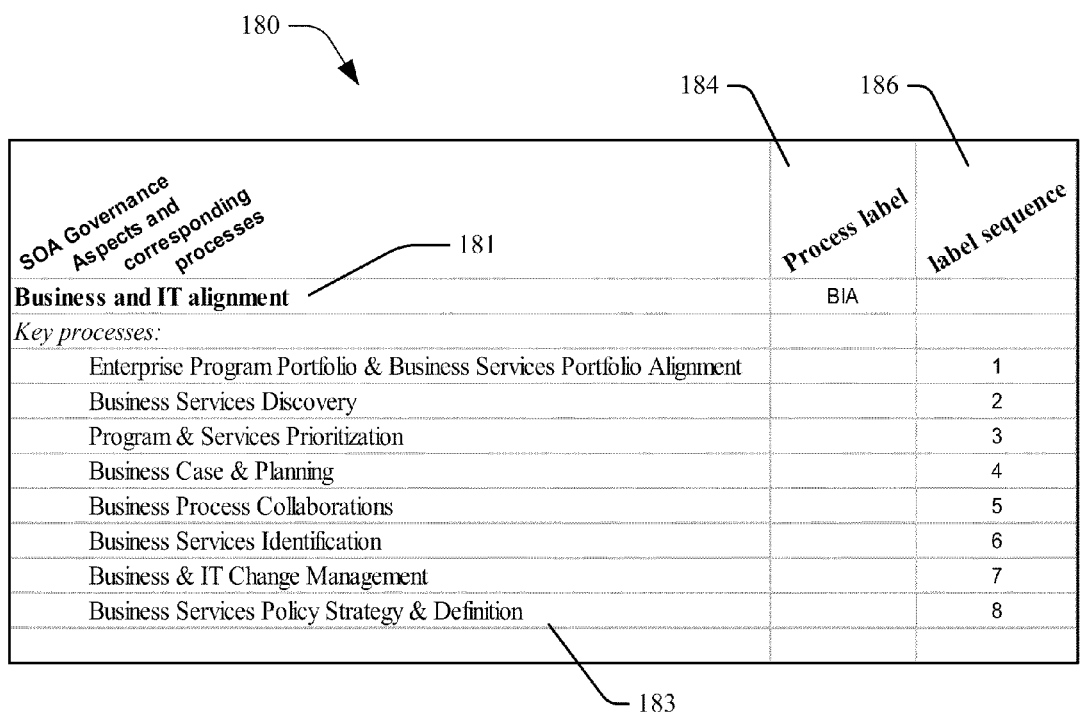
FIG. 6 is a diagram of a mapping reference table according to the present invention.

FIG. 5 provides an example of portion 176 of a spreadsheet representative of an application of the Template 160 (FIG. 4), and FIG. 6 provides a mapping reference table 180 for use with the Template 160 and the spreadsheet 176 in capturing assessed attributes and corresponding alignments mapped by entries 179 to best-matching SOA governance processes, mechanisms and techniques, for example as discussed above. In the present spreadsheet example 176 (FIG. 5) "Entities and Attributes" of the People, Skills and Organizational Capabilities governance evolution element 104 (FIG. 3) are listed in pre-defined row headings 177 with respect to five individual processes/entities 178 of each of the SOA Governance Framework 140 SOA Business and IT Alignment dimension 150, which are each identified with unique labels "BIA-1" through "BIA-5." The labels are understood through reference to the mapping reference table 180, which may be used to identify or define a particular labeled process by reference to its process label 184 and label sequence 186 indicia as correlated to the SOA Governance Framework 140 dimension 150/152/154/156 listing 181 and to its process description 183.

Mappings may be default mappings, which may be customized according to an organization's cultural preferences, to a prevailing environment around the six governance evolution elements 104, 106, 108, 110, 112, 114, and to an overall maturity of the SOA Governance 140 evolution path. Organizations may also calibrate and customize pre-defined values and mappings to best suit their organization. For example, if organizations adopting the evolution governance framework 120 (FIG. 3) do not have prior data they may use provided default values and mappings, and as the organization uses the model 120 through multiple iterations the organization may validate or revise the default values and mappings, by applying changes in response to usage through a self-learning, adaptable aspect of the present invention.

Figure 7:
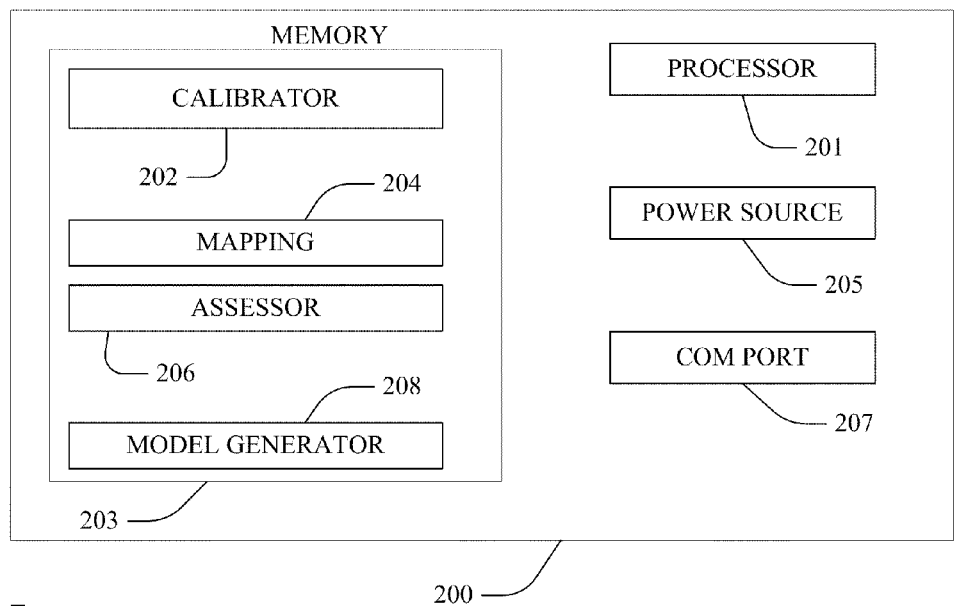
FIG. 7 is a block diagram of a system or device configured to implement a framework for SOA governance enablement according to the present invention.

FIG. 7 illustrates a programmable device or module 200 configured to implement a service evolution governance model for a service-oriented architecture according to the present invention, for example as illustrated in FIGS. 2 through 6 and described above. The device 200 may be incorporated into a larger system (such as one provided by a service provider) wherein other applications and components of the larger system accomplish systems and methods according to the present invention, or it may be a stand-alone device or module 200 configured to perform each of the systems and methods described above. The present embodiment thus comprises a central processing unit (CPU) or other processing means 201 in communication with a memory 203 comprising logic components that enable the CPU 201 to perform processes and methods according to the present application, as will be understood through reference to FIGS. 2 through 6 as discussed above. Thus, the memory 203 comprises an Calibrator logic component 202 and a Mapping logic component 204 configured to calibrate and map each of a plurality of governance dimension attributes of a service-oriented architecture to each of a plurality of governance evolution element attributes; an Assessor logic component 206 configured to performing a maturity and capability assessment for a service-oriented architecture as a function of the mapping; and a Model Generator logic component 208 configured to generating a maturity-based and capability-based governance model for the service-oriented architecture as a function of the maturity and capability assessment.

A power source 205 is configured to provide operative power to the device 200; examples include battery units 205 and power inputs configured to receive alternating or direct current electrical power, and other appropriate power units 205 will be apparent to one skilled in the art. A communication port or network link/node means ("com port") 207 is also provided and configured to enable data and other communications as may be appropriate, for example as discussed above.

II. Computerized Implementation

Figure 8:
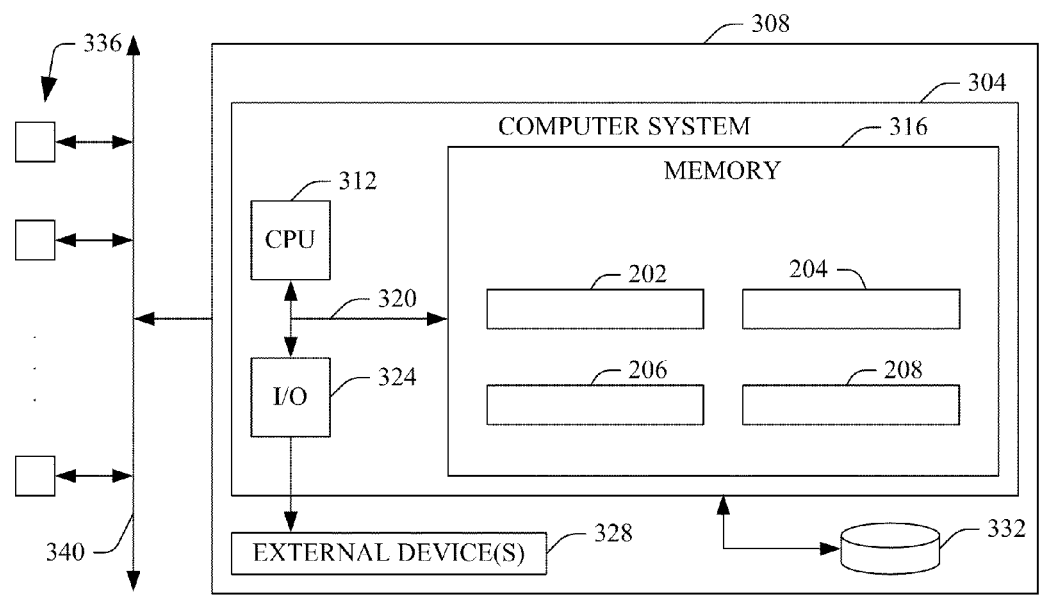
FIG. 8 is a block diagram illustrating a computerized implementation of a method or system for implementing a framework for SOA governance enablement according to the present invention.

Referring now to FIG. 8, an exemplary computerized implementation of a business services portfolio-centric SOA governance framework according to the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage systems 332. In general, the processing unit 312 executes computer program code, such as the code to implement various components of the process and systems, and devices as illustrated in FIGS. 2 through 7 and described above, including the Calibrator logic component 202, the Mapping logic component 204, the Assessor logic component 206 and the Model Generator logic component 208, and which are stored in memory 316 and/or storage system 332. It is to be appreciated that two or more, including all, of these components may be implemented as a single component.

While executing computer program code, the processing unit 312 can read and/or write data to/from the memory 316, the storage system 332 (e.g. the and/or the I/O interfaces 324. The bus 320 provides a communication link between each of the components in computer system 304. The external devices 328 can comprise any devices (e.g., keyboards, pointing devices, displays, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 8 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 2 through 8 described above and otherwise herein. To this extent, the computer-readable/useable medium includes program code that implements each of the various process steps of the present application.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal.

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary," one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer-implemented method for providing a service-oriented architecture governance model, comprising:
    calibrating and mapping by a processing unit each of a plurality of governance framework dimensions of a service-oriented architecture to each of a plurality of governance evolution elements;
    performing a maturity and capability assessment by the processing unit for a selected attribute of a plurality of attributes of one of the service-oriented architecture governance evolution elements as a function of the mapping in response to a capability assessment template input that selects the attribute and one of the mapped governance framework dimensions, wherein the template input is received by the processing unit via the steps of:
        selecting, by a user, the one governance framework dimension from a plurality of presented choices of each of the mapped governance framework dimensions, wherein the user selection categorizes the maturity and capability assessment with respect to the selected one governance framework dimension and the selected governance evolution element attribute;
        selecting, by the user, a lifecycle stage from a plurality of different presented lifecycle stage choices that are each selectable for assessing capability of the selected governance evolution element attribute;
        assigning, by the user, the selected governance evolution element attribute to one or more of a plurality of different presented governance focus components that are each determinative of a different governance enablement approach; and
        entering, by the user, values populated within one each of a current state field and a desired state field of a plurality of different presented governance evolution state choices; and
    generating by the processing unit a maturity-based and capability-based governance model for the service-oriented architecture as a function of the performed maturity and capability assessment.

2. The method of claim 1, further comprising the capability assessment template input selecting the governance framework dimension from:
    a business and information technology alignment dimension;
    an ownership and decision rights dimension;
    an asset lifecycle enablement and management dimension; and
    an operational management and monitoring dimension.

3. The method of claim 2 wherein each of the business and information technology alignment dimension, the ownership and decision rights dimension, the asset lifecycle enablement and management dimension and the operational management and monitoring dimension is defined about an enterprise business portfolio and a business services portfolio.

4. The method of claim 3, further comprising selecting the governance evolution element attributes from:
    a people skills and organization capabilities governance evolution element;
    a business innovation governance evolution element;
    a business and information technology accelerators governance evolution element;
    a business performance management governance evolution element;
    a technology adoption governance evolution element; and
    a service-oriented architecture technology infrastructure management governance evolution element.

5. The method of claim 4, wherein the selected governance evolution element attribute comprises at least one attribute from the people skills and organization capabilities governance evolution element selected from the group consisting of:
    an organization's tolerance for change in moving to a service-oriented enterprise;
    business services portfolio management capabilities;
    business services communication planning, execution and management;
    business services stakeholder management planning and execution;
    business services and service-oriented architecture skills development; and
    business domain and information technology staff planning to infuse a business services culture.

6. The method of claim 4, wherein the selected governance evolution element attribute comprises at least one attribute from the business innovation governance evolution element selected from the group consisting of:
    a management of product and services portfolio;
    a product and services portfolio driving a collaborative nature across business units;
    a business governance processes alignment with changing products and services strategy;
    a business taxonomy alignment with products and services;
    a business process alignment and management in the context of changing products and services portfolio; and
    an alignment of an information technology strategic plan based on strategic business initiatives.

7. The method of claim 4, wherein the selected governance evolution element attribute comprises at least one attribute from the business and information technology accelerators governance evolution element selected from the group consisting of:
- identifying and planning service oriented opportunities as part of business case and business program development;
- business projects prioritization based on service oriented aspects;
- an organization's ability and need to foster collaborative business components;
- business services criteria, monitoring and measurement capabilities;
- processes and mechanisms determining a technology investment path; and
- soundness of a business strategy to drive architecture design and information technology investment planning.

8. The method of claim 4, wherein the selected governance evolution element attribute comprises at least one attribute from the business performance management governance evolution element selected from the group consisting of:
- a proliferation of collaboration across an enterprise through business services;
- an ability to view business processes across collaborative business units;
- a flexibility of current infrastructure to infuse business activity-level monitoring;
- a maturity of a services portfolio to define metrics for business performance monitoring and measurement; and
- a knowledge of business process models across business units.

9. The method of claim 4, wherein the selected governance evolution element attribute comprises at least one attribute from the technology adoption governance evolution element selected from the group consisting of:
- an organization's ability to adopt a competitive and technical marketplace and incorporate the marketplace into information technology investment planning;
- a level of external market and competitive forces on a business services portfolio influencing a planning and an execution of technology investments;
- an availability of an appropriate business and economic context to drive technology integration, migration or consolidation decisions;
- an existence of established architectural approaches with ability to address future business plans; and
- a linkage between a magnitude of an issue in a current technical environment, a potential solution and a value proposition of addressing a challenge.

10. The method of claim 4, wherein the selected governance evolution element attribute comprises at least one attribute from the service-oriented architecture technology infrastructure management governance evolution element selected from the group consisting of:
- a maturity and readiness of a current or planned operation and technical infrastructure to support product and service growth;
- an allocation of system staff to a maintenance of existing systems relative to a future architectural evolution;
- a capability to monitor and report business and information technology-level metrics of business processes;
- a maturity of current application and information architectures aligning with a service-oriented view of business processes;
- a complexity and intensity of an ability to provision and manage a usage of a service-oriented enterprise;
- a business services consumer-to-provider skew; and
- an infrastructure capability to support growing business needs.

11. The method of claim 1, further comprising:
integrating computer-readable program code into a computer system comprising the processing unit, a computer readable memory and a computer readable tangible storage device;
wherein the computer readable program code is embodied on the computer readable tangible storage device and comprises instructions that, when executed by the processing unit via the computer readable memory, cause the processing unit to calibrate and map each of the plurality of governance framework dimensions to each of the plurality of governance evolution elements, perform the maturity and capability assessment for the selected governance evolution element attribute as the function of the mapping in response to the capability assessment template input, and generate the maturity-based and capability-based governance model for the service-oriented architecture as the function of the maturity and capability assessment.

12. The method of claim 11, wherein the governance framework dimension is one of:
- a business and information technology alignment dimension;
- an ownership and decision rights dimension;
- an asset lifecycle enablement and management dimension; and
- an operational management and monitoring dimension.

13. The method of claim 12 wherein the governance evolution element attribute is at least one of:
- a people skills and organization capabilities governance evolution element;
- a business innovation governance evolution element;
- a business and information technology accelerators governance evolution element;
- a business performance management governance evolution element;
- a technology adoption governance evolution element; and
- a service-oriented architecture technology infrastructure management governance evolution element.

14. A programmable device comprising:
a processing unit;
a memory in communication with the processing unit;
a tangible computer-readable storage device in communication with the processing unit; and
a network interface in communication with the processing unit and the memory;
program instructions stored on the tangible computer-readable storage device via the computer readable memory;
wherein the processing unit, when executing the program instructions stored on the tangible computer-readable storage device via the computer readable memory, is enabled to:
calibrate and map each of a plurality of governance framework dimensions of a service-oriented architecture to each of a plurality of governance evolution elements;
perform a maturity and capability assessment for a selected attribute of a plurality of attributes of one of the service-oriented architecture governance evolution elements as a function of the mapping in response to a capability assessment template input that selects the attribute and one of the mapped governance framework dimensions, wherein the template input comprises:

a user selection of the one governance framework dimension from a plurality of presented choices of each of the mapped governance framework dimensions, wherein the user selection categorizes the maturity and capability assessment with respect to the selected one governance framework dimension and the selected governance evolution element attribute;

a user selection of a lifecycle stage from a plurality of different presented lifecycle stages choice that are each selectable for assessing capability of the selected governance evolution element attribute;

a user assignment of the selected governance evolution element attribute to one or more of a plurality of different presented governance focus components that are each determinative of a different governance enablement approach; and user determination values populated within one each of a current state field and a desired state field of a plurality of different presented governance evolution state choices; and generate a maturity-based and capability-based governance model for the service-oriented architecture as a function of the performed maturity and capability assessment.

15. The programmable device of claim 14, wherein the governance dimension attribute is selected from at least one of:

a business and information technology alignment dimension;

an ownership and decision rights dimension;

an asset lifecycle enablement and management dimension; and an operational management and monitoring dimension.

16. The programmable device of claim 15, wherein the governance evolution element attribute is selected from at least one of:

a people skills and organization capabilities governance evolution element;

a business innovation governance evolution element;

a business and information technology accelerators governance evolution element;

a business performance management governance evolution element;

a technology adoption governance evolution element; and a service-oriented architecture technology infrastructure management governance evolution element.

* * * * *